2,776,402
ELECTRICAL WELL LOGGING

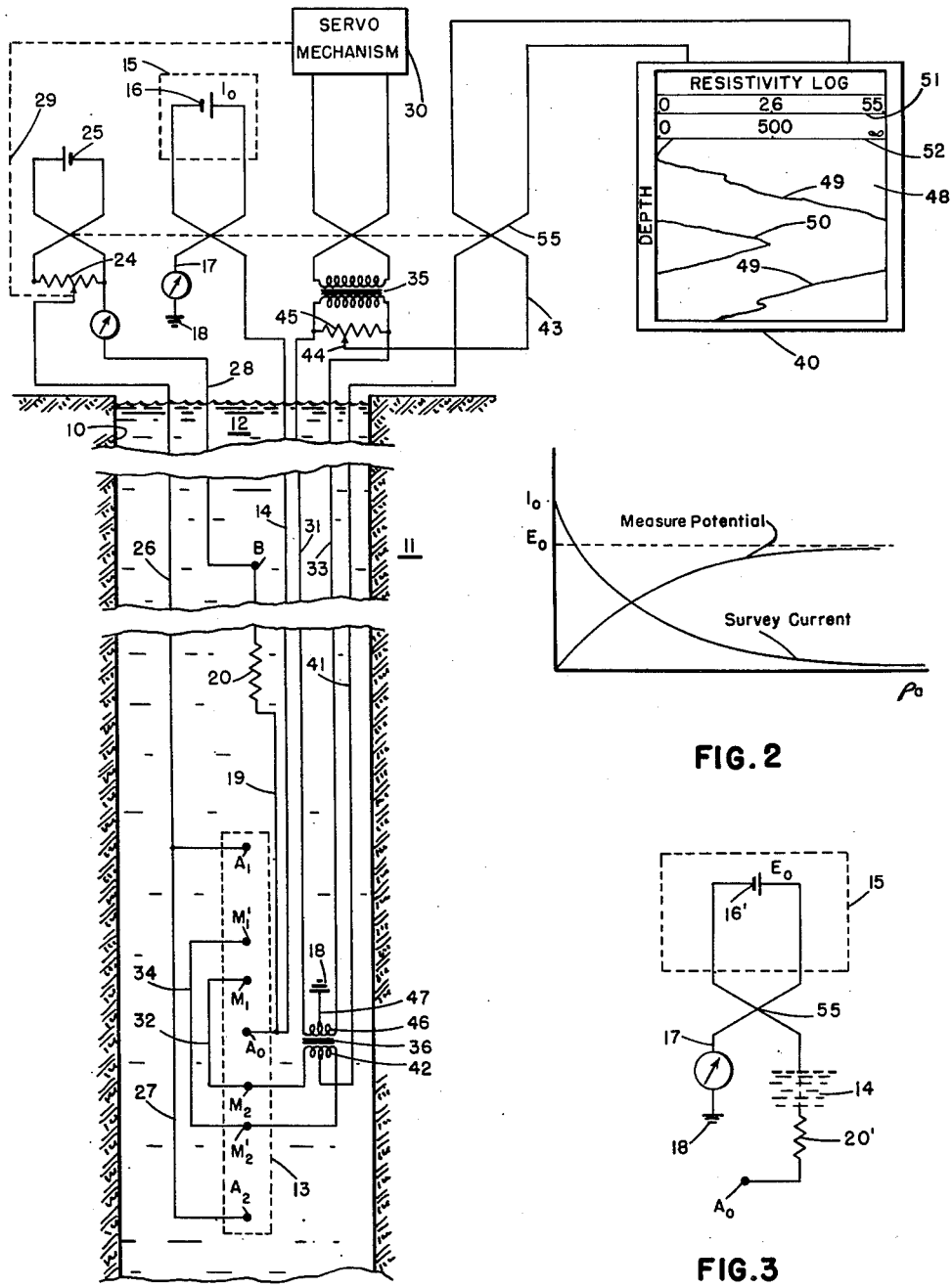

Frank P. Kokesh, Houston, Tex., assignor to Schlumberger Well Surveying Corporation, Houston, Tex., a corporation of Delaware Application March 30, 1954, Serial No. 419,762

12 Claims. (Cl. 324—1)

The present invention relates to electrical well logging and more particularly to new and improved apparatus for determining the resistivity of formations traversed by a borehole.

The apparent resistivity of earth formations has, for some time past, been obtained by introducing a steady current into such formations and determining one or more potential differences caused by the current flow. Highly sensitive and accurate records of formation resistivities are now secured in accordance with accepted oil field practice using apparatus of the type disclosed in H. G. Doll Patent No. 2,712,627, issued July 5, 1955, for "Electrical Resistivity Well Logging Method and Apparatus." Formation resistivities to which this type of apparatus accurately responds may vary from a few ohm-meters to 10,000 or more ohm-meters. To obtain a complete, readable log of such resistivity values, resort has been taken to recording instruments with three or more linear scales. While two scales may conveniently be read, additional scales make a quick comprehension of the recorded values somewhat difficult and render quite difficult correlation with conventional electrical logs. It may further be noted that a large substantially linear scale for low values of resistivity is very important to a speedy quantitative interpretation of the records obtained.

Experience with apparatus of the type shown in the above-mentioned Patent No. 2,712,627 has also demonstrated the high current demands upon an auxiliary current source when used to concentrate a steady survey current under conditions where the formation resistivity is extremely high relative to the resistivity of the drilling fluid in the borehole.

Accordingly, it is an object of this invention to provide new and improved electrical logging apparatus for indicating clearly a wide range of formation resistivities while preserving both the accuracy and the sensitivity of the measurements obtained.

Another object of the present invention is to provide a large scale, substantially linear indication of low resistivity values and also a compressed scale, non-linear indication of high resistivity values for clarity and ease of interpretation and for ready correlation with other logs.

Yet another object of this invention is to provide a varying intensity survey current which may be concentrated by an auxiliary current and which diminishes toward zero as the apparent formation resistivity approaches very high values.

These and other objects of the invention are attained by employing a survey current which varies inversely with formation resistivity and obtaining indications of resistivity values on a resistivity scale which becomes more non-linear as its full scale value is approached. A steady supply for the electrode which carries the survey current is accordingly combined with an impedance connected to this electrode in such fashion as to diminish the survey current systematically as the apparent formation resistivity increases, such that the measure potential will not exceed its full scale value. In this fashion, the measure potentials corresponding to values of resistivity ranging from zero to infinity may all give on-scale readings, while high auxiliary current requirements previously encountered opposite high resistivity formations will be alleviated due to the decrease in the survey current.

This invention and others of its objects and advantages will be better perceived from the following detailed description of preferred embodiments thereof, taken in conjunction with the accompanying drawings, in which:

Fig. 1 represents schematically an electrical logging system constructed in accordance with the invention and including an illustrative log of resistivity values obtained by the use of this apparatus;

Fig. 2 is an idealized graphic representation of the variation in both survey current and measure potential with respect to the apparent formation resistivity; and Fig. 3 represents schematically an alternative embodiment of the source of survey current which may be used with the apparatus schematically portrayed in Fig. 1.

Referring first to Fig. 1, a borehole 10 is shown passing through formations 11 and containing an electrically conductive drilling fluid 12. Disposed within the borehole 10 is an array 13 of electrodes aligned with a fixed spacing from one another for movement longitudinally through the borehole. Conventional means, such as a winch and cable (not shown), may be provided as is customary to support the array for travel through the drilling fluid 12, such cable being conveniently a multi-conductor cable having an armored sheath providing a ground return. In conventional practice, the cable sheath is insulated for a substantial distance above the array 13.

Using symbols of identification conventional in this art, the electrode array 13 comprises a main electrode $A_0$ for the survey current, auxiliary electrodes $A_1$ and $A_2$ spaced respectively on the upper and lower sides of main electrode $A_0$ for the purpose of introducing auxiliary currents, and monitoring electrodes in the vicinity of the main electrode arranged as a pair $M_1$, $M_1'$ spaced on the upper side of main electrode $A_0$ and a pair $M_2$, $M_2'$ spaced on the under side of main electrode $A_0$. The monitor electrodes $M_1'$ and $M_2'$ are spaced outwardly of electrodes $M_1$ and $M_2$, respectively, while the electrode $A_1$ and $A_2$ are spaced outwardly yet further, the spacing of corresponding electrodes on either side of the main electrode $A_0$ preferably being identical to achieve symmetry. A reference electrode B is disposed outside the array 13 and at a distance sufficiently remote that its position at a finite distance from the array has substantially the same electrical effects upon the electric field immediately about the array that, for practical purposes, the electrode B may be considered to have a position infinitely remote from the array 13. Accordingly, while the electrode B may be spaced up the cable from the array 13, for example, only a distance greater than about four times the length of the array, it will hereafter be referred to as an infinitely remote ground.

By means of a cable conductor 14, connection is made between the electrode $A_0$ and a source 15 of survey current. In accordance with the principles of this invention, this source 15 should supply current which, for increasing values of apparent formation resistivity, decrease asymptotically to zero with the result that the measure potential in the vicinity of electrode $A_0$ does not exceed its full scale value.

To accomplish this, the source 15 comprises a constant current supply 16 connected across conductors 14 and 17 to supply steady current to the electrode $A_0$ which is collected at a ground point 18 representing, for example, the armored sheath of the cable in electrical contact with the drilling fluid 12 at a point which for electrical purposes is infinitely remote from the array 13. A portion of the steady current to electrode $A_0$ is diverted from flowing as survey current into the formations by conductor 19 connecting electrode $A_0$ through an impedance such as resistance 20 with the infinitely remote electrode B. The remainder of the steady current will flow into the adjacent formations as a survey current varying with the apparent formation resistivity encountered. With the shunting resistance 20 having a fixed value $R_s$ and the steady current having a fixed value $I_0$, it may readily be demonstrated that the survey current will vary as a hyperbolic function of the apparent formation resistivities dependent upon the values $R_s$ and $I_0$. In the idealized instance of zero resistivity, the survey current will be the entire steady current $I_0$. For infinite resistivities, on the other hand, the survey current would be zero. In order that a full scale indication will represent infinite resistivity, the measure potential taken at a point in the vicinity of the electrode $A_0$ must have a full scale value $E_0$ under the condition of infinite resistivity. However, the measure potential will equal the potential of electrode $A_0$ under these conditions. Accordingly, as the potential of electrode $A_0$ would then be the product of $I_0$ and $R_s$, $R_s$ is preferably given a value equal to the ratio between $E_0$ and $I_0$. The potential of electrode $A_0$ and the measure potential will then each have a maximum value of $E_0$ for a full scale reading.

The present invention is devised as a solution to problems incident to high accuracy and sensitivity measurements of formation resistivity and thus is practiced in conjunction with the principles disclosed in the aforementioned Patent No. 2,712,627 by which such high sensitivity and accuracy measurements may be obtained. It may equally well be practiced in conjunction with the teachings of H. G. Doll Patents Nos. 2,712,628; 2,712,629; and 2,712,630, issued July 5, 1955.

A description of practices in conjunction with the principles of Patent No. 2,712,627 will suffice for the others and is selected for ease of comprehension.

Accordingly, to obtain a zero potential difference across the electrodes $M_1$ and $M_1'$ (also $M_2$ and $M_2'$) as taught in Patent No. 2,712,627, the auxiliary electrodes $A_1$ and $A_2$ are connected to an adjustable source of auxiliary current, such as current divider 24 connected across a constant current supply 25, by means of a cable conductor 26, electrodes $A_1$ and $A_2$ being connected together by an insulated shorting conductor 27. The auxiliary currents are collected at the electrode B and returned by cable conductor 28 to the current divider 24. Automatic adjustment of the current divider 24 through mechanical linkage 29 is made by a null-seeking servomechanism 30 having its input connected across the electrodes $M_1$, $M_2$ and $M_1'$, $M_2'$ by conductors 31, 32 and 33, 34, respectively, through isolation transformers 35 and 36 at either end of the cable.

The improved resistivity logs which this invention makes possible are recorded by an indicating device 40 responsive to a measure potential, which is an average of the potentials of the monitoring electrodes, supplied through what may be termed a balanced phantom measure return circuit. One of the input conductors 41 to the device 40 is center-tapped in the primary winding 42 of the transformer 36, while the other input conductor 43 is connected to a sliding tap 44 on a balancing resistance 45 connected across the secondary winding 46 of this transformer 36. The phantom return circuit is grounded by connecting a center-tap 47 on the secondary winding 46 to the remote reference ground 18. Any unbalances in the cable conductors 31 and 33 may thus be compensated for by adjustment of the tap 44 along the resistance 45.

The indicating device 40 may be of any suitable type having a linear response, such as a multiple-scale galvanometric-type of photographic recorder. With such device a photographic record 48 is obtained of low and high portions 49 and 50 of the resistivity curve traced as a function of depth and scaled respectively in accordance with a substantially linear, lower scale 51 and a non-linear, upper scale 52. It will be appreciated that the resistivity values for the curve portion 50 are quite high and would be off-scale if recorded on the basis of the lower scale 51. However, the multiple-scale device 40 is arranged automatically to trace the values which would be off-scale for scale 51 as on-scale values for scale 52 with a discontinuity at the maximum value for scale 51. The galvanometer sensitivity for scale 52 may be one-tenth that for scale 51 with the deflection a linear function of the measure potential. The exemplary values shown on the scales 51 and 52 are comparable to the values for linear scales over the ranges "0" to "50" and "0" to "500," respectively. As the value "26" on the scale 51 corresponds to a strictly linear scale value of "25" and the value "55" on scale 51 corresponds to the linear value "50," it is apparent that the scale 51 is substantially linear at its lower end and only 10 percent non-linear at its upper end. Hence, use of the indicating device 40 in conjunction with the survey current source 15 makes possible a recordation of resistivity curves using a fewer number of scales without sacrificing linearity in the region of lower values where linearity is important and, in consequence, achieving a substantial advantage over the prior art resistivity determinations.

Mention may be made of the chronological pulsator 55 connected in the circuits of the sources 15 and 25, the servomechanism 30, and the indicating device 40 for the purpose of reducing effects of naturally occurring D. C. potentials and of electrode polarization upon the resistivity determination.

As the potentials across the monitoring electrodes $M_1$, $M_1'$ and $M_2$, $M_2'$ depend directly upon the magnitude of the survey current flowing from electrode $A_0$, it will be clear that, as the survey current is diminished by increasing formation resistivities, lower values of auxiliary currents from electrodes $A_1$ and $A_2$ will be required to bring the potentials across the pairs of monitoring electrodes to zero. If, on the other hand, the survey current was of a constant value, as was preferred in the prior art, these potential differences might be brought to zero only by very large auxiliary currents.

In practice, the array 13 is lowered into the borehole 10 for movement past the formations 11 which are to be investigated. As the array 13 travels past these formations and the record 48 of the device 40 is advanced at a corresponding rate, survey current is introduced at the electrode $A_0$. This flow of survey current sets up a potential difference across the paired monitoring electrodes $M_1$, $M_1'$ and $M_2$, $M_2'$ which causes the servomechanism 30 to increase the auxiliary currents to electrodes $A_1$ and $A_2$ through adjustment of the divider 24. Contemporaneously, a measure potential, taken as the potential at a point in the vicinity of the electrode $A_0$, is supplied through the balanced phantom measure return circuit to the indicating device 40 for representation on the record 48 in accordance with appropriate scales.

The character of the systematic variation in the survey current is idealized in Fig. 2. Thus, it will be seen that with zero apparent formation resistivity, all of the current $I_0$ from the constant current supply 16 will flow through the formations. As the formation resistivity increases, the survey current will diminish as a hyperbolic function of resistivity asymptotically to zero, while the measure potential increases at first almost linearly and then quite non-linearly as a function of resistivity asymptotically to $E_0$.

In Fig. 3, there is illustrated an alternative embodiment of the survey current circuit which employs a current supply 16'. This supply 16' is preferably regulated to have a constant output potential of $E_0$ as defined above. Resistor 20' is connected in series with the supply 16' and the electrode A₀ by conductor 14 and will yield the characteristic curves of Fig. 2 when the value of the resistance 20' is made equal to E₀/I₀, that is, the same value as the resistance 20 of Fig. 1. Thus, for an apparent formation resistivity approaching infinity, survey current will cease to pass through the resistance 20' and the measure potential will approach that of the supply 16', namely E₀. If the formation resistivity were zero, the supply potential of E₀ across the resistance 20' would yield a survey current equal to I₀. However, the potential drop across the resistance 20' would equal the potential of the supply 16', and the measure potential, like the potential of the electrode A₀, would be zero. A relatively simple analysis will confirm that the survey current in this embodiment will again vary as a hyperbolic function of apparent formation resistivity.

The operation of this invention with the modification illustrated in Fig. 3 will be substantially identical to that described in conjunction with Fig. 1. These two embodiments have been described, not as the limitations of this invention, but to exemplify its principles and practice. It may thus take other forms. For example, the resistance 20 of Fig. 1 might be connected instead between the conductors 14 and 17. Likewise, the resistance 20' of Fig. 3 might be located elsewhere in the survey current circuit. Various measure circuits might be substituted. Again, it should be noted that this invention is also adapted for practice with the teachings of each of the above-mentioned Patent Nos. 2,712,628; 2,712,629; and 2,712,630.

Accordingly, these and other modifications lying within the true spirit and scope of this invention are intended to be included within the ambit of the appended claims.

I claim:

1. In apparatus for investigating the resistivity of earth formations traversed by a borehole containing a conductive drilling fluid, the combination comprising a main electrode and an auxiliary electrode on either side thereof disposed for movement together through a borehole, a regulated survey current source coupled to said main electrode and to a point remote from said main electrode for passing survey current from said main electrode into the adjacent formations, a controllable source of current connected with said auxiliary electrode for supplying auxiliary current thereto in response to the potential difference between a pair of longitudinally spaced points intermediate said electrodes to reduce the potential gradient along the borehole intermediate said spaced points substantially to zero, indicating means responsive to the potential difference measured between a point in the vicinity of said main electrode and a reference point remote from said main electrode for indicating apparent formation resistivity, and impedance means connected to said main electrode and cooperative with said survey current source to diminish the survey current with increasing values of apparent formation resistivity and thereby also to diminish the auxiliary current.

2. In a well logging apparatus, the combination comprising an electrode adapted to be lowered into a well, regulated electrical source means coupled to said electrode and to a point remote from said electrode for passing current from said electrode into adjacent formations, electrical means responsive to the potential difference between a pair of points differently spaced in the vicinity of said electrode for emitting current of proper magnitude and polarity above and below said electrode from points spaced thereabout to reduce the potential gradient along the borehole both above and below said electrode substantially to zero, means for providing indications of the potential difference measured between a point in the vicinity of said electrode and a reference point remote from said electrode, and impedance means coupled to said electrode to diminish the flow of said current into the adjacent formation as a function of said measured potential difference.

3. In well logging apparatus, the combination of a main electrode adapted to be lowered into a well, regulated electric source means connected to said main electrode and to a point remote from said main electrode for passing current from said main electrode into the surrounding earth formations, auxiliary electrodes mounted in fixed proximate relation to said main electrode on opposite sides thereof, auxiliary electric source means connected to said auxiliary electrodes and to a relatively remote reference point and responsive to the potential difference between a pair of points intermediate said electrodes for emitting current above and below said main electrode from said auxiliary electrodes to reduce the potential gradient along the borehole both above and below said main electrode substantially to zero, means for providing indications of the potential difference measured between a point in the vicinity of said pair of points and a reference point remote from said pair of points, and impedance means including a resistor connected in series with said main electric source means for diminishing the current passed from said main electrode as said measured potential difference increases.

4. In well logging apparatus, the combination of a main electrode adapted to be lowered into a well, regulated electric source means connected to said main electrode and to a point remote from said main electrode for passing current from said main electrode into the surrounding earth formations, auxiliary electrodes spaced along the borehole in fixed proximate relation to said main electrode on opposite sides thereof, auxiliary electric source means connected to said auxiliary electrodes and to a relatively remote reference point and responsive to the potential difference between a pair of points intermediate said electrodes for emitting current above and below said main electrode from said auxiliary electrodes to reduce the potential gradient along the borehole both above and below said main electrode substantially to zero, means for providing indications of the potential difference measured between a point in the vicinity of said pair of points and a reference point remote from said pair of points, and impedance means including a resistor connected between said main electrode and a point remote from said main electrode for limiting said measured potential difference to a desired maximum value.

5. In apparatus for investigating earth formations traversed by a borehole containing a conductive fluid, the combination comprising a main electrode disposed for movement longitudinally through a borehole, regulated electric source means coupled to said main electrode and to a current return point longitudinally spaced from said main electrode for passing survey current from said main electrode into adjacent formations, an auxiliary electrode including portions spaced above and below said main electrode, means responsive to a potential difference between a pair of points spaced intermediate said main and auxiliary electrodes for passing current from said auxiliary electrode tending to diminish the potential gradient along the borehole both above and below said main electrode toward zero, and impedance means coupled to said main electrode and to said electric source means for diminishing the flow of said survey current into adjacent formations as the potential of said main electrode increases.

6. In apparatus for investigating the resistivity of earth formations traversed by a borehole containing conductive fluid, the combination comprising an electrode disposed for movement through a borehole, electric source means coupled to said electrode and to a point remote from said electrode for passing current from said electrode into adjacent formations, means for emitting current of proper magnitude and polarity above and below said electrode from points spaced thereabout for maintaining a substantially zero potential gradient along the borehole both above and below said electrode, indicating means responsive to the potential with respect to ground at a point in the vicinity of said electrode and having a scale for indicating apparent formation resistivity, and impedance means connected to said electrode cooperative with said electric source means to diminish the rate of increase of said potential with increasing apparent formation resistivity thereby to render said scale non-linear for high resistivity values.

7. In apparatus for investigating the resistivity of earth formations traversed by a borehole containing conductive fluid, the combination comprising a main electrode disposed for movement through a borehole, electric source means coupled to said main electrode and to a point remote from said main electrode for passing current from said main electrode into the adjacent formations, means for emitting current of proper magnitude and polarity above and below said main electrode from points spaced thereabout for maintaining a substantially zero potential gradient along the borehole both above and below said main electrode, indicating means responsive to the potential with respect to ground at a point in the vicinity of said main electrode and having a scale for indicating apparent formation resistivity, and a resistance connected with said main electrode to limit the increase in said potential to a fixed maximum value with increases in apparent formation resistivity, thereby to compress said scale at its upper end.

8. In apparatus for investigating the resistivity of earth formations traversed by a borehole containing conductive fluid, the combination comprising a main electrode disposed for movement through a borehole, a constant current source coupled to said main electrode and to a point remote from said main electrode for passing current from said main electrode into the adjacent formations, means for emitting current of proper magnitude and polarity above and below said main electrode from points spaced thereabout for maintaining a substantially zero potential gradient along the borehole both above and below said main electrode, a scaled indicating device connected to a point in the vicinity of said main electrode and to a remote reference point and having a deflection linearly proportional to the potential difference between such points, and a resistance connected with said main electrode and with an electrically remote point to render said deflection a non-linear function of increasingly high apparent formation resistivities as full scale deflection is approached.

9. In apparatus for investigating the resistivity of earth formations traversed by a borehole containing conductive fluid, the combination comprising a main electrode disposed for movement through a borehole, a constant potential current source coupled to said main electrode and to a point remote from said main electrode for passing survey current from said main electrode into the adjacent formations, means for emitting current of proper magnitude and polarity above and below said electrode from points spaced thereabout for maintaining a substantially zero potential gradient along the borehole both above and below said main electrode, a scaled indicating device connected to a point in the vicinity of said main electrode and to a remote reference point and having a deflection linearly proportional to the potential difference between such points and a resistance serially connected with said main electrode and said current source to render said deflection a non-linear function of increasingly high values of apparent formation resistivity as full scale deflection is approached.

10. In apparatus for investigating a resistivity of earth formations traversed by a borehole containing conductive fluid, the combination comprising an electrode disposed for movement through a borehole, a current source coupled to said electrode and to a point remote from said electrode for passing survey current from said electrode into adjacent formations, means for emitting current of proper magnitude and polarity above and below said electrode from points spaced thereabout for maintaining a substantially zero potential gradient along the borehole both above and below said electrode, and impedance means connected to said electrode cooperative with said current source to diminish the survey current systematically as a function of increasing values of the apparent formation resistivity.

11. In apparatus for investigating the resistivity of earth formations traversed by a borehole containing conductive fluid, the combination comprising an electrode disposed for movement through a borehole, a constant current source coupled to said electrode and to a point remote from said electrode for passing survey current from said electrode into the adjacent formations, means for emitting current of proper magnitude and polarity above and below said electrode from points spaced thereabout for maintaining a substantially zero potential gradient along the borehole both above and below said electrode, and an impedance connected to said main electrode and to a point at electrical infinity with respect to said electrode to diminish the survey current systematically as a function of increasing values of apparent formation resistivity.

12. In apparatus for investigating the resistivity of earth formations traversed by a borehole containing conductive fluid, the combination comprising an elongated electrode array having a main electrode for passing survey current into adjacent formations, auxiliary electrode means on either side of said main electrode and in the vicinity thereof for emitting current of proper magnitude and polarity above and below said main electrode for maintaining a substantially zero potential gradient along the borehole both above and below said main electrode, a reference electrode supported in fixed relation to said electrode array at a point which is substantially at electrical infinity with respect thereto, and a resistance connected between said main electrode and said reference electrode to by-pass a portion of the survey current.

References Cited in the file of this patent

UNITED STATES PATENTS

| | | |
|---|---|---|
| 2,712,627 | Doll | July 5, 1955 |
| 2,712,628 | Doll | July 5, 1955 |